(12) United States Patent
Terashima

(10) Patent No.: US 9,560,483 B2
(45) Date of Patent: Jan. 31, 2017

(54) POSITIONING SATELLITE SIGNAL RECEIVING METHOD AND POSITIONING SATELLITE SIGNAL RECEIVING APPARATUS

(71) Applicant: Seiko Epson Corporation, Tokyo (JP)

(72) Inventor: Maho Terashima, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/537,016

(22) Filed: Nov. 10, 2014

(65) Prior Publication Data

US 2015/0133153 A1    May 14, 2015

(30) Foreign Application Priority Data

Nov. 11, 2013    (JP) ................. 2013-233439

(51) Int. Cl.
*H04W 24/00* (2009.01)
*H04W 4/02* (2009.01)
*H04W 64/00* (2009.01)
*H04W 24/08* (2009.01)

(52) U.S. Cl.
CPC ............ *H04W 4/023* (2013.01); *H04W 24/08* (2013.01); *H04W 64/006* (2013.01); *Y02B 60/50* (2013.01)

(58) Field of Classification Search
CPC ...... H04W 4/02; H04W 64/006; H04W 24/08; H04W 64/00
See application file for complete search history.

(56) References Cited

U.S. PATENT DOCUMENTS

| | | | |
|---|---|---|---|
| 5,982,811 A | 11/1999 | Harrison et al. | |
| 6,151,353 A * | 11/2000 | Harrison et al. | ............... 375/136 |
| 2004/0190660 A1* | 9/2004 | Morris | ................ H03M 7/3028 |
| | | | 375/350 |
| 2006/0083293 A1* | 4/2006 | Keegan et al. | ................ 375/148 |
| 2010/0290505 A1* | 11/2010 | Nagano et al. | ................ 375/143 |
| 2011/0199578 A1* | 8/2011 | Black et al. | .................. 351/206 |
| 2011/0237277 A1 | 9/2011 | Terashima et al. | |
| 2013/0343436 A1 | 12/2013 | Terashima | |
| 2014/0010252 A1 | 1/2014 | Kawakami et al. | |
| 2014/0376598 A1* | 12/2014 | Keegan et al. | ................ 375/148 |

FOREIGN PATENT DOCUMENTS

| | | |
|---|---|---|
| JP | 2011-220998 A | 11/2011 |
| JP | 2013-246017 A | 12/2013 |
| JP | 2014-006187 A | 1/2014 |

* cited by examiner

*Primary Examiner* — Khalid Shaheed
(74) *Attorney, Agent, or Firm* — Harness, Dickey & Pierce, P.L.C.

(57) ABSTRACT

A method includes tracking positioning satellite signal using a first data string obtained by sampling received signal of the positioning satellite signal at a first sampling rate that is a non-integer multiple of a chip rate, and capturing the positioning satellite signal using a second data string obtained by sampling the received signal at a second sampling rate that is an integer multiple of the chip rate.

6 Claims, 4 Drawing Sheets

POSITIONING SATELLITE SIGNAL RECEIVING METHOD AND POSITIONING SATELLITE SIGNAL RECEIVING APPARATUS

CROSS-REFERENCE

This application claims priority to Japanese Patent Application No. 2013-233439, filed Nov. 11, 2013, the entirety of which is hereby incorporated by reference.

BACKGROUND

1. Technical Field

The present invention relates to a positioning satellite signal receiving method etc.

2. Related Art

Positioning satellite signal receivers represented by GPS (Global Positioning System) receivers have been widely spread. The GPS receiver captures a plurality of GPS satellite signals, performs position calculation using navigation messages superimposed and carried on the respective captured GPS satellite signals, and thereby, obtains a position and a clock error (clock bias) of the GPS receiver. There are many requests for the GPS receiver, and particularly, a representative request for the GPS receiver mounted on a portable electronic apparatus is to reduce power consumption. In order to respond to the request, for example, JP-A-2011-220998 discloses a technology of reducing power consumption by reducing an amount of correlation calculation between received signals and replica codes.

The above described technology of JP-A-2011-220998 reduces the power consumption by sampling the received signals at a sampling rate of an integer multiple of a chip rate of C/A (Coarse and Acquisition) codes as spread codes of the GPS satellite signals and performing correlation calculation. However, with the sampling rate of the integer multiple, there is a tendency that the peak of the calculation result of the correlation calculation is broader compared to the case where the received signals are sampled at a sampling rate of a non-integer multiple of the chip rate of C/A codes because the sampling numbers are equal among the respective chips of C/A codes. As a result, accuracy of acquired measurement data may be lower.

In the GPS receiver, first, the GPS satellite signals are acquired, and then, the position calculation is performed using the measurement data (reception frequency and code phase) acquired from the tracked GPS satellite signals. The accuracy of the position calculation depends on the accuracy of the measurement data (reception frequency and code phase) for use.

SUMMARY

An advantage of some aspects of the invention is to realize reduction of power consumption while securing accuracy of position calculation in a receiver that receives positioning satellite signals.

A first aspect of the invention is directed to a method including tracking positioning satellite signal using a first data string obtained by sampling received signal of the positioning satellite signal at a first sampling rate that is a non-integer multiple of a chip rate, and capturing the positioning satellite signal using a second data string obtained by sampling the received signals at a second sampling rate that is an integer multiple of the chip rate of the positioning satellite signal.

As another aspect, the invention may be configured as an apparatus including a first generator configured to generate a first data string by sampling received signal of positioning satellite signal at a first sampling rate of a non-integer multiple of a chip rate of the positioning satellite signal, a second generator configured to generate a second data string by sampling the received signal at a second sampling rate that is an integer multiple of the chip rate, a selector configured to select the second data string when the apparatus captures the positioning satellite signal and select the first data string when the apparatus tracks the positioning satellite signal, and a correlation calculator configured to perform correlation calculation between the data string selected by the selection unit and a replica code.

According to the first aspect and the like, reduction of power consumption may be realized while accuracy of position calculation is secured. That is, when capturing of the positioning satellite signal is performed, the second data string formed by sampling of the received signal at the second sampling data of the integer number of the chip rate is used, and thereby, priority may be given to the reduction of the power consumption. When tracking of the positioning satellite signal is performed, the first data string formed by sampling of the received signals at the first sampling data of the non-integer number of the chip rate is used, and thereby, priority may be given to the accuracy of the position calculation.

As a second aspect, the aspect described above may be configured as the method further including generating the second data string by predetermined conversion calculation of the first data string.

According to the second aspect, the second data string is generated by the predetermined conversion calculation of the first data string.

As a third aspect, the aspect described above may be configured as the method wherein the second sampling rate is lower than the first sampling rate.

According to the third aspect, the second data string is generated at the second sampling rate lower than the first sampling rate.

As a fourth aspect, the aspect described above may be configured as the method further including generating the first data string, and storing the first data string in a memory unit, wherein the tracking includes performing the tracking using the first data string stored in the memory unit, and generating the second data string includes generating the second data string from the first data string stored in the memory unit.

According to the fourth aspect, the generated first data string is stored in the memory unit and the tracking of the positioning satellite signals is performed using the first data string stored in the memory unit. Further, the second data string is generated using the first data string stored in the memory unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Configuration

Figure 1:
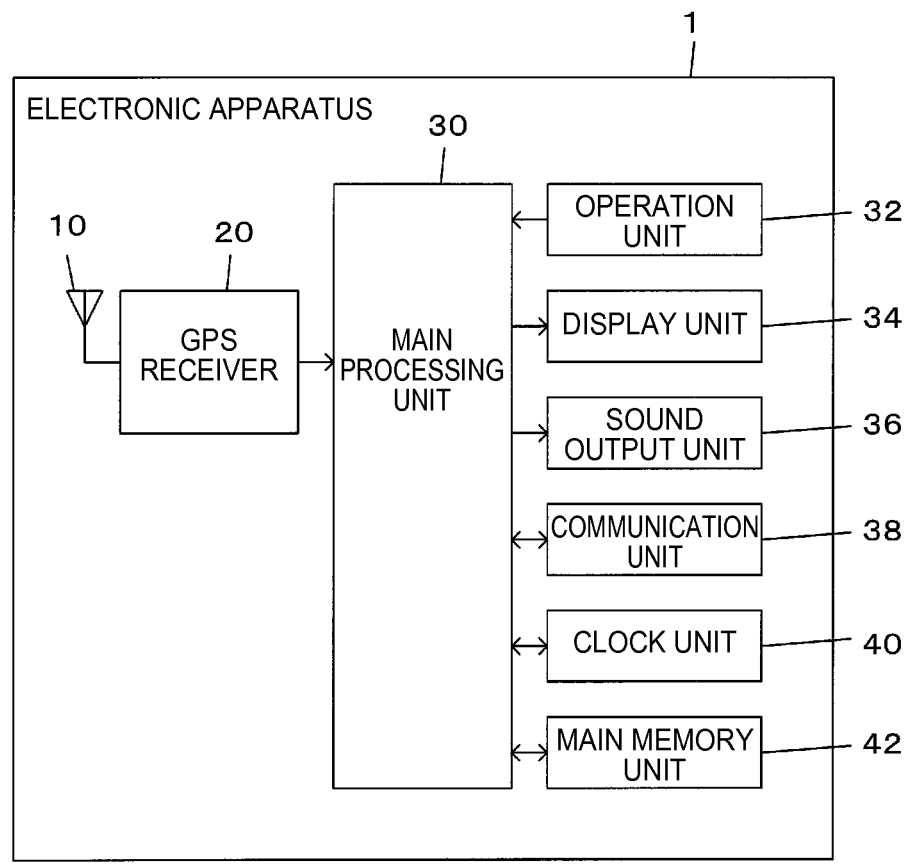
FIG. 1 shows a configuration example of an electronic apparatus.

FIG. 1 is a configuration diagram of an electronic apparatus 1 in an embodiment. As shown in FIG. 1, the electronic apparatus 1 includes a GPS antenna 10, a GPS receiver 20, a main processing unit 30, an operation unit 32, a display unit 34, a sound output unit 36, a communication unit 38, a clock unit 40, a main memory unit 42.

The GPS antenna 10 is an antenna that receives RF (Radio Frequency) signals containing GPS satellite signals as positioning satellite signals transmitted from GPS satellites as positioning satellites. The GPS satellite signals are signals spread-spectrum-modulated using C/A codes as a kind of spread codes, and superimposed on carrier wave at 1.57542 [GHz].

The GPS receiver 20 calculates a position and a clock error (clock bias) of the GPS receiver 20 based on navigation messages including orbital information (ephemeris and almanac) of the GPS satellites superimposed and carried on the GPS satellite signals received by the GPS antenna 10.

The main processing unit 30 is realized using a processor such as a CPU (Central Processing Unit) or a DSP (Digital Signal Processor), and performs integrated control on the respective units of the electronic apparatus 1 according to various programs including a system program stored in the main memory unit 42.

The operation unit 32 is an input device including a touch panel, a button switch, etc., and outputs operation signals in response to user's operation to the main processing unit 30.

The display unit 34 is a display device including an LCD (Liquid Crystal Display) and performs various kinds of display based on display signals from the main processing unit 30.

The sound output unit 36 is a sound output device including a speaker and performs various kinds of sound output based on sound signals from the main processing unit 30.

The communication unit 38 is a communication device including a wireless LAN (Local Area Network) and Bluetooth (registered trademark) and performs communication with an external apparatus.

The clock unit 40 is an internal clock and includes an oscillator circuit having a crystal oscillator or the like, and measures a current time, a lapse time from a designated time, etc.

The main memory unit 42 is a memory device including a ROM (Read Only Memory), a RAM (Random Access Memory), etc., stores programs and data for realization of various functions of the electronic apparatus 1 in addition to the system program for integrated control of the respective units of the electronic apparatus 1 by the main processing unit 30 and used as a work area of the main processing unit 30, and temporarily stores calculation results of the main processing unit 30, operation data from the operation unit 32, etc.

Figure 2:
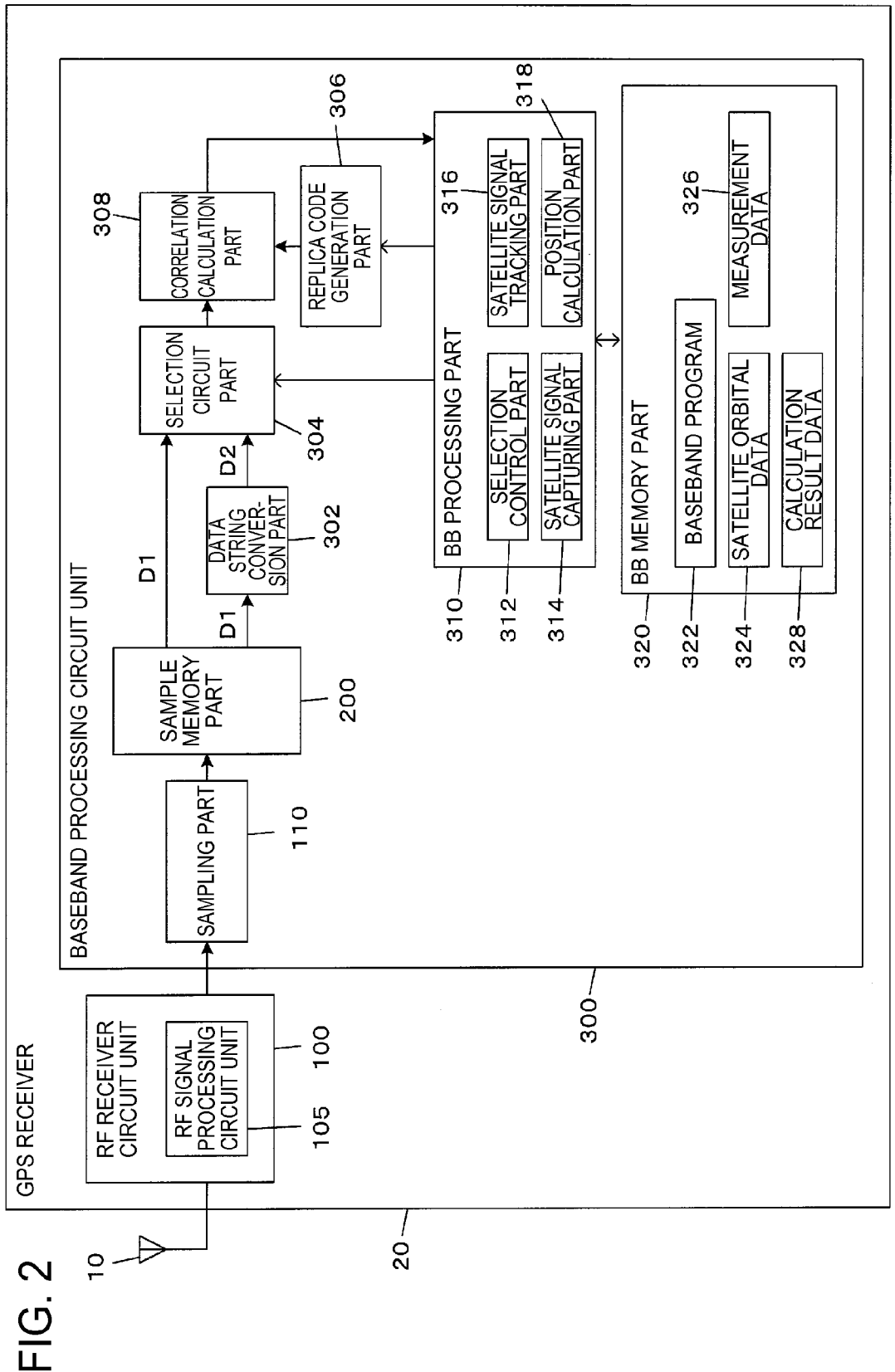
FIG. 2 shows a configuration example of a GPS receiver.

FIG. 2 is a configuration diagram of the GPS receiver 20. As shown in FIG. 2, the GPS receiver 20 includes an RF receiver circuit unit 100 and a baseband processing circuit unit 300. Note that the RF receiver circuit unit 100 and the baseband processing circuit unit 300 may be manufactured as separate LSIs (Large Scale Integrations) or manufactured as one chip.

The RF receiver circuit unit 100 down-converts the RF signals received by the GPS antenna 10 into intermediate frequency signals (IF signals), amplifies them, and then, converts the signals into digital data and output them. Supposing that a circuit unit before conversion to digital data is an RF signal processing circuit unit 105, the RF receiver circuit unit 100 converts analog signals output from the RF signal processing circuit unit 105 into digital data using an A/D (Analog/Digital) converter (not shown), and outputs the signals as received signals to the baseband processing circuit unit 300.

The baseband processing circuit unit 300 captures and tracks the GPS satellite signals using the data of the received signals received by the RF receiver circuit unit 100, and calculates the position and the time error of the GPS receiver 20 using time information, satellite orbital information, etc. extracted from the captured GPS satellite signals. Further, the baseband processing circuit unit 300 includes a sampling part 110, a sample memory part 200, a data string conversion part 302, a selection circuit part 304, a correlation calculation part 308, a replica code generation part 306, a BB (BaseBand) processing part 310, and a BB memory part 320.

The sampling part 110 samples the received signals output from the RF receiver circuit unit 100 at a first sampling rate and generates a first data string D1. The first sampling rate is determined as a value of a non-integer multiple of the chip rate (1.023 [MHz]) of the C/A codes as the spread codes of the GPS satellite signals. The non-integer multiple uses a non-integer positive value, e.g., a positive decimal number. The sampling part 110 corresponds to a first generation unit.

The sample memory part 200 stores the first data string D1.

The data string conversion part 302 performs predetermined conversion calculation on the first data string D1 stored in the sample memory part 200, and thereby, generates a second data string D2 corresponding to a data string formed by sampling of the received signals at a second sampling rate. Specifically, the first data string D1 has data at sampling times corresponding to the first sampling rate. By interpolation of data between the respective sample times of the first data string D1, data values at sample times corresponding to the second sampling rate are estimated. As the interpolation calculation, for example, known interpolation calculation including linear interpolation, Lagrangian interpolation, and spline interpolation may be used. The data string conversion part 302 outputs the generated second data string D2 to the selection circuit part 304. The data string conversion part 302 corresponds to a second generation unit.

The second sampling rate is determined as a value of an integer multiple of the chip rate (1.023 [MHz]) of the C/A codes. For generation of the second data string D2 by interpolation calculation on the first data string D1, the second sampling rate is determined to be lower than the above described first sampling rate. For example, the sampling rates are determined such that the first sampling rate is "2.112[MHz]" and the second sampling rate is "2.046 [MHz]".

The selection circuit part 304 selects either of the first data string D1 stored in the sample memory part 200 or the second data string D2 output from the data string conversion part 302 according to a selection command signal from the BB processing part 310, and outputs the string to the correlation calculation part 308. The selection circuit part 304 corresponds to a selection unit singly or with a selection control part 312, which will be described later.

The replica code generation part 306 generates replica codes of the C/A codes. Specifically, the part generates replica codes having PRN (Pseudo Random Noise) numbers designated from the BB processing part 310 with designated phase shift quantities and sampling rates.

The correlation calculation part 308 performs correlation calculation between the data string selected by the selection circuit part 304 and the replica codes generated by the replica code generation part 306.

The BB processing part 310 is realized by a processor such as a CPU or DSP, and performs integrated control on the respective parts of the baseband processing circuit unit 300. Further, the BB processing part 310 has a selection control part 312, a satellite signal capturing part 314, a satellite signal tracking part 316, and a position calculation part 318.

The selection control part 312 controls the selection circuit part 304 to select the data string. Specifically, the part outputs a selection command signal for commanding selection of the second data string D2 output from the data string conversion part 302 when the GPS satellite signals are captured and outputs a selection command signal for commanding selection of the first data string D1 of the sample memory part 200 when the captured GPS satellite signals are tracked to the selection circuit part 304.

The satellite signal capturing part 314 captures the GPS satellite signals. Specifically, the part designates the PRN numbers, the phase shift quantities, and the sampling rates of the GPS satellite signals as capturing candidates for the replica code generation part 306, and allows the correlation calculation part 308 to perform correlation calculation between the second data string D2 and the replica code corresponding to the GPS satellites to capture. Then, the part performs peak detection on the calculation result by the correlation calculation part 308 and, if a peak equal to or larger than a certain value is detected, determines capturing of the GPS satellite signals. Further, the reception frequency and the code phase at which the peak is detected is used as measurement data 326.

The sampling rate designated by the satellite signal capturing part 314 is a value of an integer multiple of the chip rate, e.g., the chip rate (a multiple by one). The correlation calculation using the second data string D2 is performed by repeated obtainment of multiplication data strings at chip intervals obtained by multiplication of data at chip intervals of the respective data of the second data string D2 by the respective data of the replica codes generated at the chip rate while the start position of the multiplication is shifted by the data interval of the second data string D2, the multiplication data strings for the sampling rate of the finally obtained received signals are combined (integrated), and thereby, a correlation calculation result is obtained.

In other words, supposing that the sampling rate of the received signals is n (n is a positive integer number), multiplication results of the first data, the (n+1)th data, . . . of the second data string D2 and the respective data of the replica codes, multiplication results of the second data, the (n+2)th data, . . . and the respective data of the replica codes, multiplication results of the nth data, the (n+n)th data, . . . and the respective data of the replica codes are combined (integrated), and thereby, a correlation result with respect to one phase is obtained. By multiplication of the first data, the (n+1)th data, . . . of the second data string D2 and the phase-shifted data of the replica code and combination with the multiplication data strings before phase shift at each phase of one chip, a correlation result after phase shift is obtained.

The satellite signal tracking part 316 tracks the GPS satellite signals captured by the satellite signal capturing part 314. Specifically, the part designates the PRN numbers, the phase shift quantities, and the sampling rates of the GPS satellite signals to track for the replica code generation part 306, and allows the correlation calculation part 308 to perform correlation calculation between the first data string D1 and the replica codes corresponding to the GPS satellites to track. The correlation calculation in tracking is known correlation calculation of multiplying and integrating the respective data of the first data string D1 and the respective data of the replica codes. Then, the part performs peak detection on the correlation calculation result by the correlation calculation part 308 and, if a peak equal to or larger than a certain value is detected, determines tracking of the GPS satellite signals. Further, the reception frequency and the code phase at which the peak is detected is used as measurement data 326. Furthermore, the part decodes the GPS satellite signals to track, acquires data of almanac, ephemeris, etc. and stores the data as satellite orbital data 324 in the BB memory part 320. Note that the sampling rate designated by the satellite signal tracking part 316 is a value of a non-integer multiple of the chip rate, e.g., the first sampling rate.

The position calculation part 318 performs position calculation processing using the satellite orbital data 324 acquired with respect to each GPS satellite tracked by the satellite signal tracking part 316 and the measurement data 326 obtained by tracking, and thereby, calculates the position and the clock error (clock bias) of the GPS receiver 20 (electronic apparatus 1). As the position calculation processing, for example, a known technique of least squares, Karman filter, or the like may be applied. The data of the position and the clock error calculated by the position calculation part 318 is accumulated and stored as calculation result data 328.

The BB memory part 320 is realized by a memory device such as a ROM or RAM, and stores programs, data, etc. for realization of various functions in addition to the system program for the BB processing part 310 to perform integrated control on the baseband processing circuit unit 300 and is used as a work area of the BB processing part 310 and temporarily stores the calculation result of the BB processing part 310 etc. In the embodiment, a baseband program 322, the satellite orbital data 324, the measurement data 326, and the calculation result data 328 are stored in the BB memory part 320.

Flow of Processing

Figure 3:
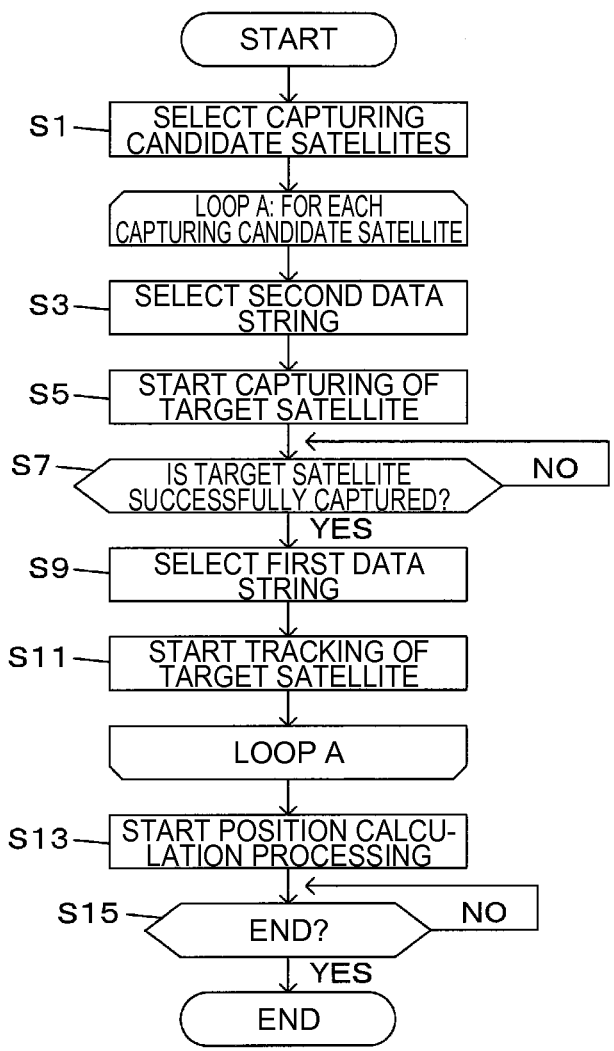
FIG. 3 is a flowchart of baseband processing.

FIG. 3 is a flowchart for explanation of a flow of baseband processing. The processing is executed by the BB processing part 310 according to the baseband program 322.

First, the BB processing part 310 performs selection of capturing candidate satellites (step S1). That is, referring to the satellite orbital data 324, the part selects GPS satellites located in the sky (at an elevation angle equal to or more than 0 degrees) at the current time timed by the clock unit 40 as the capturing candidate satellites. Further, in the case where the part has no satellite orbital data 324 at the cold start or the like, the part sets all GPS satellites as the capturing candidate satellites.

Then, processing of Loop A with respect to each capturing candidate satellite is performed. In Loop A, the selection control part 312 outputs a selection command signal of commanding selection of the second data string D2 output from the data string conversion part 302 to the selection circuit part 304 and allows input of the second data string D2 to the correlation calculation part 308 (step S3). Then, the satellite signal capturing part 314 attempts to capture capturing candidate satellites as targets (step S5).

Waiting for capturing of the capturing target satellites (step S7: NO), if the capturing target satellites are captured (step S7: YES), the selection control part 312 changes the selection command signal to the selection circuit part 304 to a signal for commanding selection of the first data string D1 stored in the sample memory part 200 (step S9). Then, the satellite signal tracking part 316 starts tracking of the capturing candidate satellites as the targets (step S11). Note that, at step S7, if capturing of the capturing target satellite in a predetermined period is attempted, but fails, the capturing target satellite may be regarded as being not capturable and the processing may move to step S3, and the processing at step S3 and the subsequent steps may be performed on the other capturing target satellites. The processing of Loop A is performed in the above described manner.

When the processing of Loop A on all of the capturing candidate satellites is ended, the position calculation part 318 performs position calculation processing based on the GPS satellite signals being captured and tracked at each predetermined position calculation time, for example (step S13). Then, the BB processing part 310 determines whether or not the baseband processing is ended, if the processing is not ended (step S15: NO), continues the position calculation processing, and, if the processing is ended (step S15: YES), ends the position calculation processing and ends the baseband processing.

Advantages

As described above, in the GPS receiver 20 of the embodiment, when the GPS satellite signals are captured, the correlation calculation between the second data string D2 formed by sampling of the received signals at the second sampling rate of the integer multiple of the chip rate of the C/A codes and the replica codes is performed. Further, when the GPS satellite signals are tracked, the correlation calculation between the first data string D1 formed by sampling of the received signals at the first sampling rate of the non-integer multiple of the chip rate of the C/A codes and the replica codes is performed. Here, the second sampling rate is the integer multiple of the chip rate of the C/A codes. Thereby, the number of data per one chip is constant and the correlation calculation result may be obtained by combination of the multiplication data strings at the chip intervals. Thus, regarding the data strings according to the same C/A code, at the capturing of the positioning satellite signals using the second data string D2, priority may be given to reduction of the amount of calculation, i.e., reduction of power consumption. On the other hand, at the tracking of the positioning satellite signals using the first data string D1 formed by sampling at the first sampling rate of the non-integer multiple, the sampling numbers are different among the respective chips of the C/A codes, and the peak of the correlation calculation result is likely to be sharper than that in the case of using the second data string D2. As a result, measurement with higher accuracy than that in the case of using the second data string D2 may be obtained, and priority may be given to the accuracy of the position calculation.

Modified Examples

The embodiments to which the invention may be applied are not limited to the above described embodiment, but changes may be appropriately made without departing from the scope of the invention. The modified examples will be described later, and the same configurations as those of the embodiment have the same signs for explanation of the modified examples and their explanation will be omitted.

(A) GPS Receiver

Figure 4:
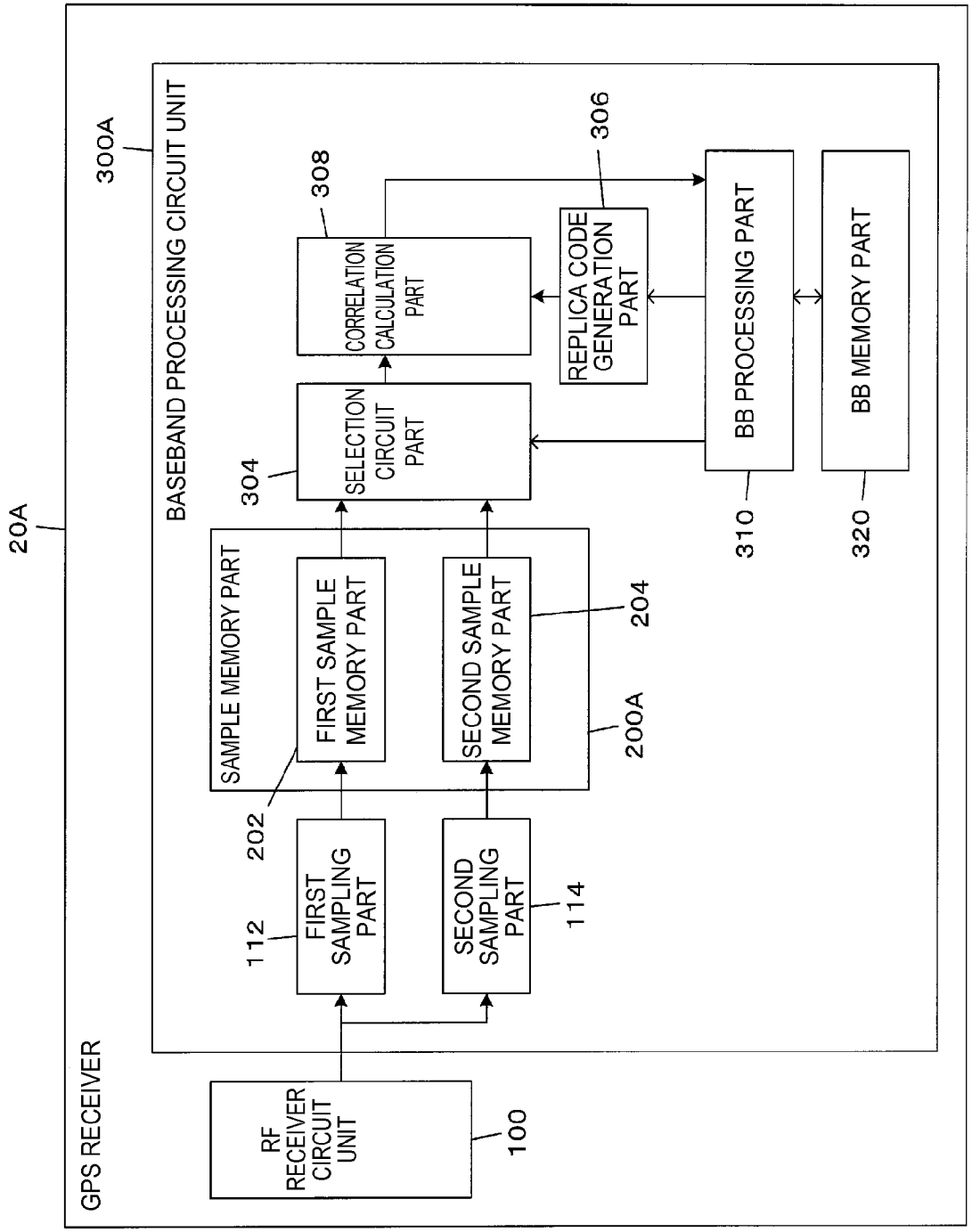
FIG. 4 shows another configuration example of the GPS receiver.

The GPS receiver 20 may have a configuration as shown in FIG. 4. A GPS receiver 20A shown in FIG. 4 includes an RF receiver circuit unit 100 and a baseband processing circuit unit 300A.

The baseband processing circuit unit 300A has a first sampling part 112, a second sampling part 114, a first sample memory part 202, a second sample memory part 204, a selection circuit part 304, a replica code generation part 306, a correlation calculation part 308, a BB processing part 310, and a BB memory part 320.

The first sampling part 112 generates a first data string D1 by sampling of received signals output from an RF signal processing circuit part 105 at a first sampling rate. The second sampling part 114 generates a second data string D2 by sampling of the received signals output from the RF signal processing circuit part 105 at a second sampling rate. The first sample memory part 202 stores the first data string D1 generated by the first sampling part 112. The second sample memory part 204 stores the second data string D2 generated by the second sampling part 114.

(B) Main Actor of Processing

Further, in the above described embodiment, the explanation that the BB processing part 310 (position calculation part 318) of the baseband processing circuit unit 300 executes the position calculation processing has been made, however, the main processing unit 30 may execute the processing.

(C) Electronic Apparatus

As electronic apparatuses, the invention may be applied to various electronic apparatuses including a running watch, a car navigation system, a portable navigation system, a personal computer, a PDA (Personal Digital Assistant), a cell phone, and a wristwatch, for example.

(D) Satellite Positioning System

In the above described embodiment, the GPS has been explained as an example of the satellite positioning system, however, other satellite systems including WAAS (Wide Area Augmentation System), QZSS (Quasi Zenith Satellite System), GLONASS (GLObal Navigation Satellite System), GALILEO, and BeiDou (BeiDou Navigation Satellite System) may be employed.

What is claimed is:

1. A method comprising:
    tracking positioning satellite signal using a first data string obtained by sampling received signal of the positioning satellite signal at a first sampling rate that is a non-integer multiple of a chip rate of the positioning satellite signal; and
    capturing the positioning satellite signal using a second data string obtained by sampling the received signal at a second sampling rate that is an integer multiple of the chip rate.

2. The method according to claim 1, further comprising generating the second data string by predetermined conversion calculation of the first data string.

3. The method according to claim 2, wherein the second sampling rate is lower than the first sampling rate.

4. The method according to claim 2, further comprising:
    generating the first data string; and
    storing the first data string in a memory unit,
    wherein the tracking includes performing the tracking using the first data string stored in the memory unit, and generating the second data string includes generating the second data string from the first data string stored in the memory unit.

5. An apparatus comprising:
a first generator configured to generate a first data string by sampling received signal of positioning satellite signal at a first sampling rate that is a non-integer multiple of a chip rate of the positioning satellite signal;
a second generator configured to generate a second data string by sampling the received signal at a second sampling rate that is an integer multiple of the chip rate;
a selector configured to select the second data string when the apparatus captures the positioning satellite signal and select the first data string when the apparatus tracks the positioning satellite signal; and
a correlation calculator configured to perform correlation calculation between the data string selected by the selector and a replica code, wherein the second sampling rate is greater than the chip rate and less than the first sampling rate.

6. A method comprising:
acquiring a target positioning satellite signal using a second data string obtained by sampling received signal of the target positioning satellite signal at a second sampling rate that is an integer multiple of the chip rate; and
tracking the acquired target positioning satellite signal using a first data string obtained by sampling the received signal of the target positioning satellite signal at a first sampling rate that is a non-integer multiple of a chip rate of the positioning satellite signal.

* * * * *